(12) United States Patent
Zhao et al.

(10) Patent No.: US 8,549,309 B1
(45) Date of Patent: Oct. 1, 2013

(54) ASYMMETRIC CONTENT FINGERPRINTING WITH ADAPTIVE WINDOW SIZING

(75) Inventors: Xiaoming Zhao, Jiangsu (CN); Gang Chen, Jiangsu (CN); Kan Dong, Jiangsu (CN)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 13/566,861

(22) Filed: Aug. 3, 2012

Related U.S. Application Data

(62) Division of application No. 12/136,583, filed on Jun. 10, 2008, now Pat. No. 8,386,792.

(51) Int. Cl.
*H04L 9/32* (2006.01)

(52) U.S. Cl.
USPC .......................................................... 713/176

(58) Field of Classification Search
USPC .......................................................... 713/176
See application file for complete search history.

(56) References Cited

U.S. PATENT DOCUMENTS

| | | | |
|---|---|---|---|
| 6,493,709 B1 | 12/2002 | Aiken | |
| 6,584,470 B2 | 6/2003 | Veale | |
| 7,031,972 B2 | 4/2006 | Ren et al. | |
| 8,032,757 B1 | 10/2011 | Zhao et al. | |
| 2003/0120647 A1 | 6/2003 | Aiken et al. | |
| 2003/0172066 A1 | 9/2003 | Cooper et al. | |
| 2004/0162786 A1 | 8/2004 | Cross et al. | |
| 2006/0101069 A1* | 5/2006 | Bell et al. | 707/103 R |
| 2006/0253439 A1 | 11/2006 | Ren et al. | |

OTHER PUBLICATIONS

Saul Schleimer, et al. "Winnowing: Local Algorithms for Document Fingerprinting", Jun. 9-12, 2003, 10 sheets, SIGMOD 2003.
Bloom Filters—the math, 6 sheets [retrieved on May 6, 2008], retrieved from the internet: http://pages.cs.wisc.edu/cao/papers/summary-cache/node8.html.
Soumen Chakrabarti, et al. "Scalable feature selection, classification and signature generation for organizing large text databases into hierachical taxonomies", 1998, pp. 163-178, vol. 7, No. 3, the VLDB Journal.
Aris Anagnostopoulos, et al. "Sampling Search-Engine Results", May 10-14, 2005, pp. 245-256, Proceedings of the 14th International Conference on World Wide Web.
Jianhong Chen, "Knowledge Discovery and Data Mining Based on Power Plant Real-Time Database: A Survey", Oct. 8-12, 2001, pp. 1-5, Proc. of International Conference on Power Engineering.
Liang Chen, et al. "Template Detection for Large Scale Search Engines" , Apr. 23-27, 2006, 5 pages, SAC '06.

(Continued)

*Primary Examiner* — Jacob Lipman
(74) *Attorney, Agent, or Firm* — Okamoto & Benedicto LLP

(57) ABSTRACT

Processes for fingerprinting a document file and for preventing information leakage are disclosed. Computer apparatus for implementing said processes are also disclosed. For fingerprinting a document, the document is provided and may be normalized. A sequence of hash values are generated for the document. A window size is adaptively determined depending upon the document. Fingerprints for the document are selected from amongst the hash values using the adaptively-sized window. The fingerprints for the document are added to a fingerprint set for content being protected by the information leakage prevention system. For information leakage prevention, suspect documents are processed at the deployment points by extracting fingerprints from the suspect documents and matching the extracted fingerprints against the fingerprints in the fingerprint set. Different fingerprint extraction methods are used at the server and the deployment points. Other embodiments, aspects and features are also disclosed.

16 Claims, 7 Drawing Sheets

(56) References Cited

OTHER PUBLICATIONS

Nigel Hamilton "The Mechanics of a Deep Net Metasearch Engine", 2003, 2 pages, Proceedings of the 12th International World Wide Web Conference.

Mark Jessop, et al. "Pattern Matching Against Distributed Datasets", 2004, 6 pages, Dept. of Computer Science, University of York, United Kingdom.

Wei-Cheng Lai, et al. "An Anatomy of a Large-Scale Image Search Engine", Dec. 2002, 4 pages, IEEE MSE.

Victor Lavrenko, et al. "Relevance Models for Topic Detection and Tracking," 2002, 6 pages, Dept. of Computer Science, University of Massachussetts, Amherst, MA.

Shrideep Pallickara, et al. "Incorporating an XML Matching Engine in Distributed Brokering Systems", 2003, pp. 1-7, Proceedings of the International Conference on Parallel and Distributed Processing Techniques and Applications (PDPTA '03).

* cited by examiner

| P=8 | | P=16 | |
| --- | --- | --- | --- |
| N | Pfail | N | Pfail |
| 50 | 0.0013 | 50 | 0.04 |
| 100 | 1.6E-6 | 100 | 0.0016 |
| 200 | 2.5E-12 | 200 | 2.5E-6 |
| 400 | 6.4E-24 | 400 | 6.1E-12 |

FIG. 7

ASYMMETRIC CONTENT FINGERPRINTING WITH ADAPTIVE WINDOW SIZING

CROSS-REFERENCE TO RELATED APPLICATIONS

The present application is a divisional application of U.S. patent application Ser. No. 12/136,583, filed Jun. 10, 2008, the disclosure of which is hereby incorporated by reference. The present application is related to U.S. patent application Ser. No. 12/122,003, entitled "Methods and Apparatus for Content Fingerprinting for Information Leakage Prevention," filed May 16, 2008, by inventors Xiaoming Zhao, Gang Chen, and Kan Dong.

BACKGROUND

1. Field of Art

The present disclosure generally relates to the fields of information security and computer software. More specifically, it relates to the field of information leakage prevention.

2. Description of the Related Art

Information leakage prevention (ILP) systems are becoming more important for enterprise computing systems. Serious information leakage accidents have caused substantial losses and have damaged corporate images. Such accidents currently occur one after the other. In addition, regulations promulgated by governments require enterprises to properly protect their digital information from leaking.

SUMMARY

Processes for fingerprinting a document file and for preventing information leakage are disclosed. Computer apparatus for implementing said processes are also disclosed.

For fingerprinting a document, the document is provided and may be normalized. A sequence of hash values are generated for the document. A window size is adaptively determined depending upon the document. Fingerprints for the document are selected from amongst the hash values using the adaptively-sized window. The fingerprints for the document are added to a fingerprint set for content being protected by the information leakage prevention system.

For information leakage prevention, fingerprints are extracted from private documents using an adaptively-sized window at a server of an information leakage prevention system. The window is adaptively-sized in that its size depends upon the document being fingerprinted. A pattern file is formed which includes the aforementioned fingerprints for the private documents, and the fingerprint set is distributed to deployment points of the information leakage prevention system. Suspect documents are processed at the deployment points by extracting fingerprints from the suspect documents and matching the extracted fingerprints against the fingerprints in the pattern file. Different fingerprint extraction methods are used at the server and the deployment points.

Other embodiments, aspects and features are also disclosed.

BRIEF DESCRIPTION OF DRAWINGS

The disclosed embodiments have other advantages and features which will be more readily apparent from the following detailed description and the appended claims, when taken in conjunction with the accompanying drawings, in which:

FIG. 7 shows a table pertaining to the scale of a second Bloom filter in accordance with sparse 0 mod P.

DETAILED DESCRIPTION

Information Leakage Prevention (ILP) System

Figure 1:
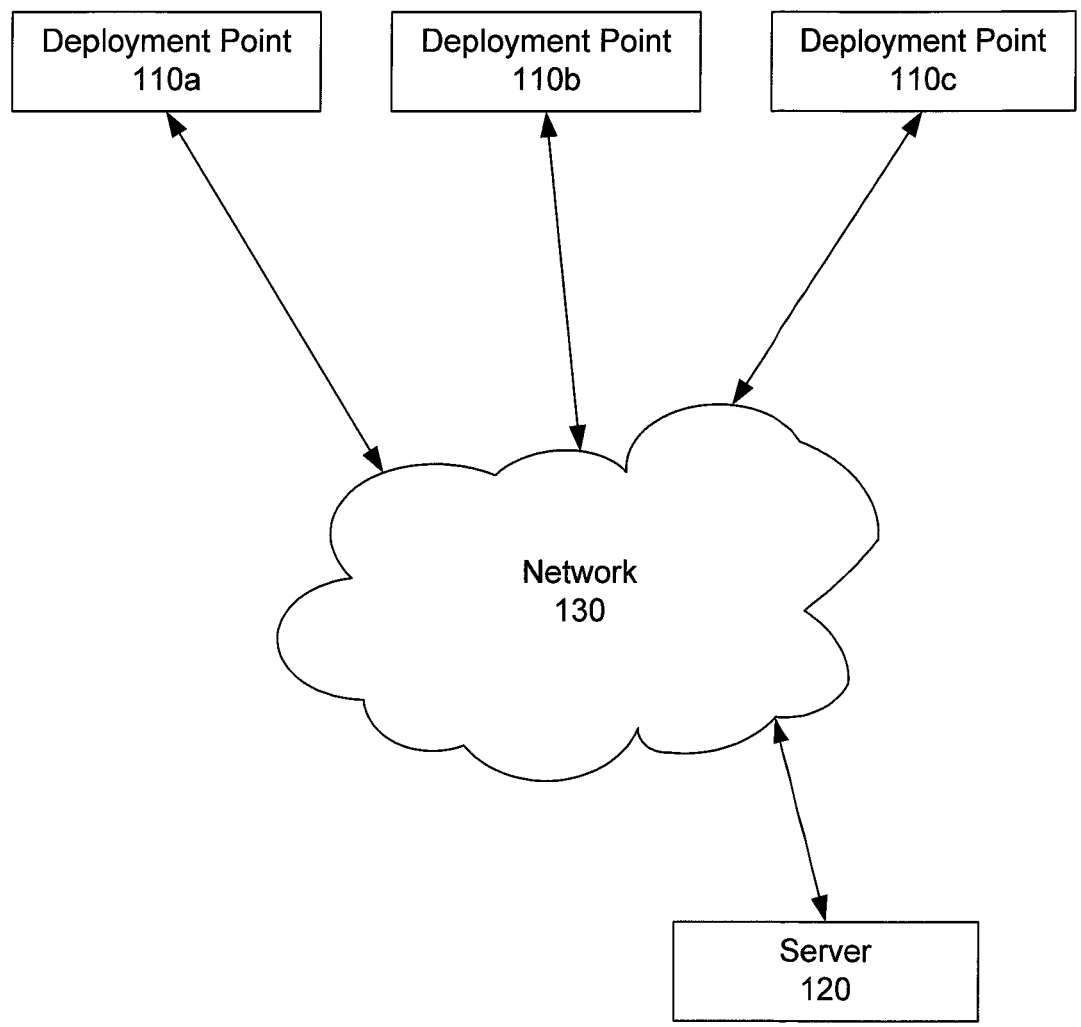
FIG. 1 is a high-level schematic diagram of an enterprise sensitive information management system in accordance with an embodiment of the present invention.

FIG. 1 is a high-level schematic diagram of an enterprise sensitive information management (or information leakage prevention) system 100 in accordance with an embodiment of the present invention. The system 100 monitors and manages sensitive information in an enterprise network. The system 100 includes deployment points 110a-c and a server 120. Each of the deployment points 110 can be a computer (e.g., laptop computers, desktop computers), or a device with data access capabilities (e.g., handheld computing devices, embedded devices with a processor and operating or control system), or a network appliance or device through which network traffic flows and may be inspected (e.g., a network gateway, etc.). The server 120 is a computing device that, in accordance with an embodiment of the invention, may perform a signature deployment process. In the signature generation process, generated signatures are distributed from the server 120 to the deployment points 110.

The deployment points 110 and the server 120 are connected through a network 130. The network 130 may be a wired or wireless network or a combination thereof. Examples of the network 130 include the Internet, an intranet, a cellular network, or a combination thereof. It is noted that each of the deployment points 110 and the server 120 are structured to include a processor, memory, storage, network interfaces, and applicable operating system and other functional software (e.g., network drivers, communication protocols, etc.).

Figure 2:
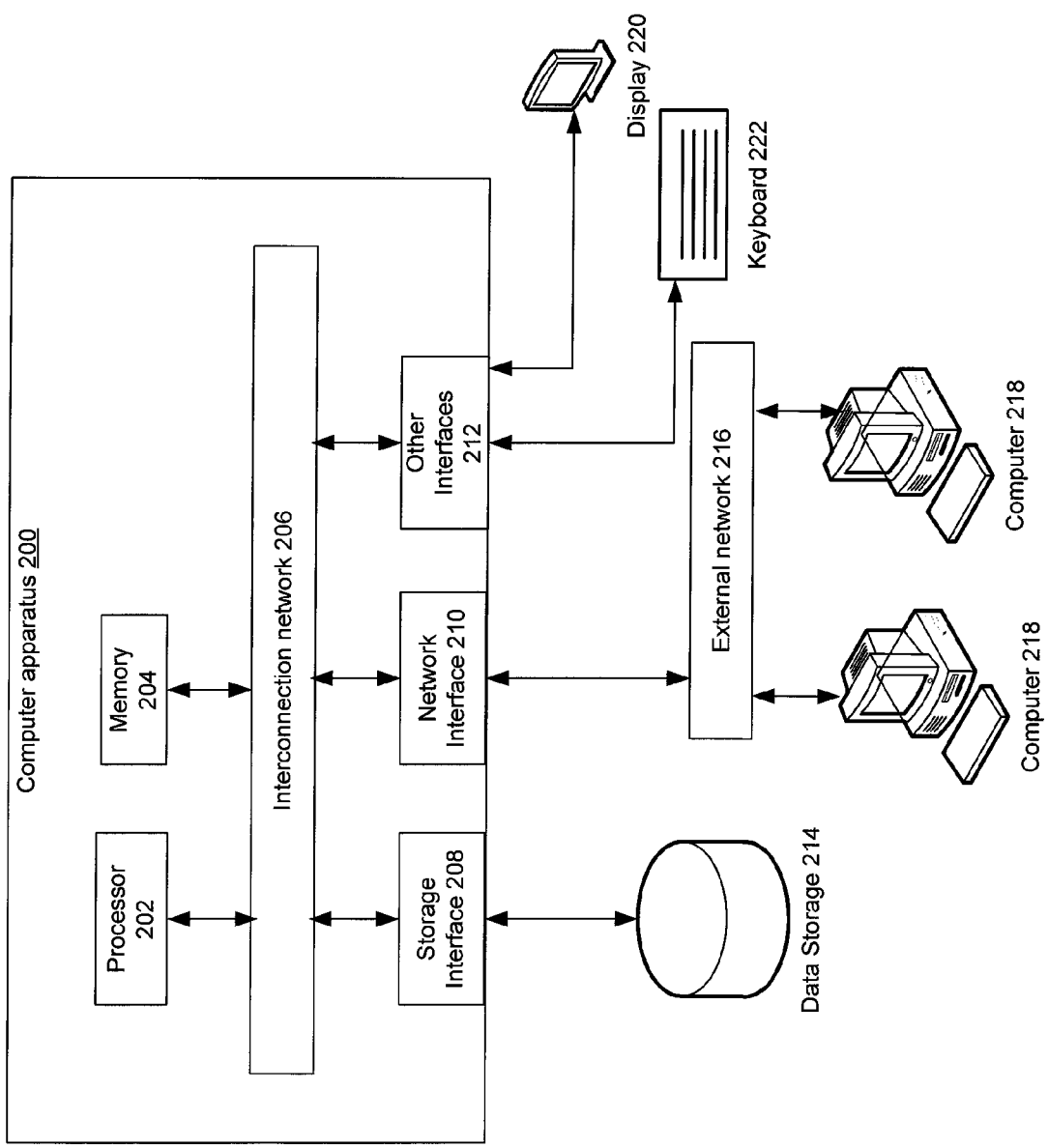
FIG. 2 is a schematic diagram depicting an example computer apparatus which may be configured to perform various method steps in accordance with an embodiment of the invention.

FIG. 2 is a schematic diagram depicting an example computer apparatus 200 which may be configured to perform various method steps in accordance with an embodiment of the invention. Other designs for the computer apparatus may be used in alternate embodiments. As discussed above, embodiments of the present invention may be performed by multiple computer apparatus 200 communicatively interconnected by a network.

As shown in FIG. 2, the computer apparatus 200 comprises a processor 202, a computer-readable memory system 204, a storage interface 208, a network interface 210, and other interfaces 212. These system components are interconnected through the use of an interconnection network (such as a system bus or other interconnection system) 206. The memory 204 may be configured to include, in addition to other components and data, processor-executable instructions to perform various method steps disclosed herein.

The storage interface 208 may be used to connect storage devices 214 to the computer apparatus 200. The network interface 210 may be used to communicate with other computers 218 by way of an external network 216. The other interfaces may interface to various devices, for example, a display 220, a keyboard 222, and other devices.

In an information leakage prevention (ILP) system, there are two phases involving fingerprinting. The first phase is at "crawl time" when the set of documents being protected are fingerprinted. The second phase is at "match time." Match time refers to the matching performed at deployment points 110 to detect information leakage from the sensitive information management system 100.

Classical 0 mod P

An older technique to do content fingerprinting is called "0 mod P", where "mod" stands for modulo. In this patent application, we refer to this older technique as "classical 0 mod P". Classical 0 mod P is a relatively straightforward technique, but it is not highly efficient.

A k-gram may be defined as a contiguous substring of length K from a document, where K is a parameter chosen by the user. There are almost as many k-grams as there are characters in the document, as every position in the document, except for the last (k−1) positions, marks the beginning of a k-gram.

In practical approaches to fingerprinting documents, only a small subset of the set of all k-gram hashes is retained. The classical 0 mod P approach retains all hashes that are 0 mod P, given a fixed P. Hence, only 1/P of all hashes are retained as fingerprints in this approach.

A disadvantage with the classical 0 mod P technique is that it does not include a guaranteed match feature. This is because a k-gram shared between documents is detected only if its hash is 0 mod P. This lack of a guaranteed match feature is especially problematic for applications in information leakage prevention, where it is desirable to be able to guarantee a match for sufficiently long content fractions.

Conventional Winnowing

In this application, "conventional Winnowing" refers to a relatively efficient algorithm which has been adopted by many anti-plagiarism systems. The conventional Winnowing algorithm is described, for example, in "Winnowing: Local Algorithms for Document Fingerprinting," Saul Schleimer, Daniel S. Wilkerson, and Alex Aiken, SIGMOD 2003, San Diego, Calif., Jun. 9-12, 2003 (hereinafter, the Schleimer paper), which is hereby incorporated by reference. The conventional Winnowing algorithm described in the Schleimer paper guarantees to produce at least one fingerprint for any data section longer than a minimum match size parameter, S. In other words, any fractional portion of the original document with a length no less than S characters would be detected by conventional Winnowing.

According to the Schleimer paper, the minimum match size parameter, S, is equal to K+W−1, where K is the k-gram size, and W is the window size. A window of size W is defined as W consecutive hashes of k-grams in a document, where W is another parameter chosen by the user.

For example, consider the following parameter values for the window size and the k-gram size: W=200 and K=100. Using these parameters, conventional Winnowing may be applied to a set of documents, and corresponding fingerprints may be extracted and retained. Thereafter, when a document is being examined to find a match against the set of documents, any matching content fraction longer than W+K−1=200+100−1=299 characters will be detected by conventional Winnowing.

According to the Schleimer paper, the average density of conventional Winnowing is proven to be 2/(W+1). That is, there will be one hash value selected to be a signature for each (W+1)/2 characters in the processed documents. For the above-described example with W=200 characters, there will be about one hash value retained as a signature for each one hundred characters in the processed documents. Note also that hash value selection using conventional Winnowing is position independent in that the same fraction of data will always produce the same set of fingerprints, independent of data content before or after the fraction.

Although conventional Winnowing has some advantages, it also has substantial disadvantages. While the guaranteed match feature of Winnowing is desirable, it comes with a problem in that the fingerprint data is of relatively large size. On average, according to the density of 2/(W+1) from the Schleimer paper, about two hash values in each window are selected using conventional Winnowing. This relatively high density results in a disadvantageously large amount of data storage needed to store all the fingerprint data.

For example, if the window W=200 characters (one byte per character), then approximately every 100 bytes in the private content will produce a fingerprint. Each fingerprint may be 8 bytes long, for example. Hence, in this example, 100 gigabytes of private documents would lead to the generation of a fingerprint pattern file which is about 8 gigabytes in size. Such a large pattern file may be feasible to be stored and used in a gateway appliance. However, for a desktop or other end point solution, such a large pattern file would likely be impractical.

To reduce the size of the pattern file, a larger window size W may be used. For example, if W=20,000 bytes, then the pattern file extracted from 100 gigabytes of private documents would be reduced from 8 gigabytes to 80 megabytes. However, in that case, the minimum match size would be much greater, such that private documents whose length is shorter than about 20 kilobytes would be smaller than the minimum match size and would not be guaranteed protection.

Asymmetric Content Fingerprinting with Adaptive Window Sizing

An innovative approach disclosed in this patent application improves upon the conventional content fingerprinting approaches, particularly when applied in the context of an information leakage prevention system. As disclosed herein, "asymmetric content fingerprinting with adaptive window sizing" provides a solution to the pattern size problem while maintaining certain guaranteed match features. Here, "adaptive window sizing" refers to using a technique which adapts or adjusts the window size when "crawling" through the private documents to generate the fingerprint pattern file. In particular, the window size adopted depends upon a size of the normalized document being fingerprinted. "Asymmetric" refers to the use of different content fingerprint extraction methods at crawl time and at match time.

To substantially reduce the size of the fingerprint pattern file produced by content fingerprinting of private documents, the present application discloses producing, at crawl time, a fixed or nearly fixed size of fingerprint data for each document. Hence, a document which is 100 kilobytes in size will produce a same or similar amount of fingerprint data as a document which is 100 megabytes in size.

In addition, the present application discloses using a relative length, instead of an absolute length, for the minimum length of a part of a document that will be guaranteed to be detected at match time (i.e. the minimum match size). In other words, any portion of a document whose length is no less than a certain fraction or percentage of the document will be guaranteed to be detected by the leakage prevention system. One may define a parameter p to be the minimum guaranteed fraction, where 0<p<1.

This adaptive technique provides both (i) a fixed size for the fingerprint data extracted from a document and (ii) a minimum match size which is relative to the length of the document. In order to do so, a window size is dynamically (i.e. adaptively) selected at crawl time according to the size of the (normalized) document. Note that, in accordance with an embodiment of the present invention, the k-gram size does not vary between documents.

Figure 3:
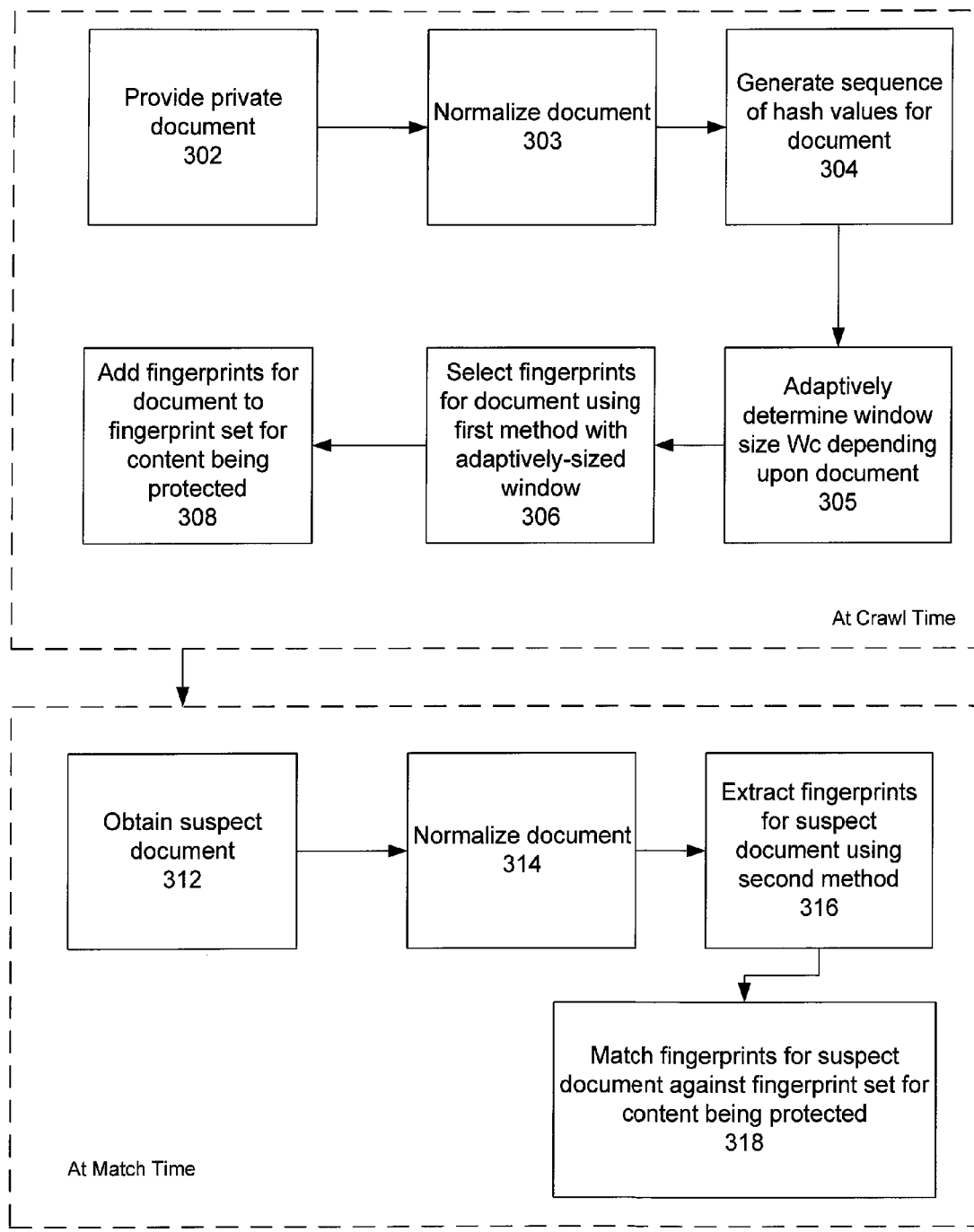
FIG. 3 is a flow chart depicting a process performed for information leakage prevention using asymmetric content fingerprinting with adaptive window sizing in accordance with an embodiment of the invention.

FIG. 3 is a flow chart depicting a process 300 for information leakage prevention using asymmetric content fingerprinting with adaptive window sizing in accordance with an embodiment of the invention. This process 300 may be performed, for example, using an ILP system 100 which includes a server 120 and deployment points 110.

The process 300 begins by providing 302 a private document whose leakage from the system is to be prevented. The private document may be normalized 303, for example, by removing extraneous characters, such as extra white space, and so forth.

A sequence of hash values for the document is then generated 304. As discussed above, the hash values may be generated by dividing the document into k-grams and hashing each k-gram to create a corresponding hash value.

Only some of these hash values will be selected 306 to be fingerprints (signatures) for the private document. In order to perform the selection 306 of fingerprints, a first method is applied that utilizes a window of size $W_c$ (where the subscript "c" refers to crawl time). As discussed above, in accordance with an embodiment of the present invention, the window size $W_c$ is a "floating" (i.e. variable) size that is adaptively determined 305 in dependence on the private document being fingerprinted.

The selected fingerprints for the private document are added 308 to the fingerprint set (sometimes referred to as the pattern file) for the content being protected by the ILP system. Steps 302 through 308 of the process 300 may be repeatedly performed until all documents to be protected by the ILP system 100 have their fingerprints added to the pattern file.

While the above steps of the 302 through 308 of the process 300 relate to fingerprinting of private documents to be protected, for example, at a server 120, the following steps 312 through 318 pertain to extracting fingerprints from suspect documents and matching them against the fingerprints of the private documents to be protected, for example, at a deployment point 110.

A suspect document is obtained 312. The suspect document may be obtained 312, for example, by intercepting an outgoing communication including the document from a deployment point 110. The suspect document may be normalized 314, for example, by removing extraneous characters, such as extra white space, and so forth.

Fingerprints for the suspect document are extracted 316 using a second method which differs from the aforementioned first method. For example, in accordance with one embodiment, a fixed window size $W_m$ (where the subscript "m" refers to match time) may be utilized to select the fingerprints for the suspect document, and those fingerprints are matched 318 against the fingerprints from the protected documents. In accordance with another embodiment, a rolling calculation of hash values are made, and each hash value calculated is matched 318 against the fingerprints from the protected documents.

In summary, although various window sizes are used on the documents being protected at crawl time, it would be impractical to analyze a document being scanned with all those various window sizes at match time. Rather, in accordance with an embodiment of the invention, a single window size that is fixed, or a rolling hash value calculation, may be used at match time. More particularly, to ensure that any hash values selected at crawl time will also be selected at match time, the selection of hash values at match time may be based on a finer granularity than at crawl time.

While a generalized discussion of aspects of the present invention is given above, actual implementations may use various specific algorithms. For example, one implementation, discussed in detail below, adapts and applies the conventional "Winnowing" technique. This implementation may be referred to "asymmetric Winnowing with adaptive window sizing." Another implementation, also discussed in detail below, modifies the "classical 0 mod P" technique. This embodiment may be referred to as "asymmetric sparse 0 mod P with adaptive window sizing."

Asymmetric Winnowing with Adaptive Window Sizing

The above-discussed technique of conventional Winnowing is generally used in a symmetric way to extract signatures and detect matches. That is to say, the same k-gram size, K, and the same window size, W, are used in both phases. If there are common parts long enough (greater than or equal to K+W−1 characters) located in both the private document being protected and the document to be checked, then conventional Winnowing will detect a match.

In accordance with an embodiment of the present invention, the same k-gram size, K, but different window sizes are used to extract signatures at crawl time (Wc) and detect matches at match time (Wm). Because the window sizes are different at crawl and match times, this technique may be referred to as asymmetric Winnowing.

Consider, in general, Fingerprint (D, K, W) to be the fingerprint set generated by Winnowing, where D is the document, K is the k-gram size, and W is the window size. Further, consider that $W_c$ is the window size at crawl time, and $W_m$ is window size at match time. Applicants submit that it will be true that when $W_c > W_m$, then Fingerprint (D, K, Wc) is a subset of Fingerprint (D, K, $W_m$).

Based on the above, applicants have designed an ILP system with the following characteristics:

i. At both crawl time and match time, a fixed k-gram size, K, is adopted;

ii. At crawl time, a floating window size, $W_c$, is adopted for documents with different size. $W_c$ is constrained to be no less than a constant minimum value, $W_{min}$; and iii. At match time, a fixed window size $W_m = W_{min}$ is adopted.

The following is a discussion of an algorithm or rule that may be used for selection of $W_c$ at crawl time for a particular private document. Provided p as the minimum guaranteed percentage and S as the size of a private document, then to have a guaranteed match, the following becomes true.

$$p \cdot S \geq W_c + K - 1 \qquad \text{(Equation 1)}$$

Hence, the algorithm for choosing $W_c$ may be expressed as follows.

$$W_c = \begin{cases} p \cdot S - K + 1, & \text{if } S > \dfrac{W_{min} + K - 1}{p} \\ W_{min}, & \text{if } S \leq \dfrac{W_{min} + K - 1}{p} \end{cases} \quad \text{(Equation 2)}$$

According to the density of Winnowing, the average number of fingerprints, C, extracted from a file is as follows.

$$C = (S - K + 1) \cdot \frac{2}{W_c + 1} \quad \text{(Equation 3a)}$$

Hence, combining Equations 2 and 3 gives the following expression the average number of fingerprints extracted from a file.

$$C = \begin{cases} 2 \cdot \dfrac{S - K + 1}{p \cdot S - K + 2}, & \text{if } S > \dfrac{W_{min} + K - 1}{p} \\ 2 \cdot \dfrac{S - K + 1}{W_{min} + 1}, & \text{if } S \leq \dfrac{W_{min} + K - 1}{p} \end{cases} \quad \text{(Equation 4a)}$$

If $p \cdot S \gg K$, then $C \approx 2/p$. Since in most cases S is much larger than K, a reasonable estimate of an average number of fingerprints extracted from a file is $C \approx 2/p$.

For example, consider that K=100, $W_{min}$=200, and p=5%. Furthermore, consider the situation where an average document size, S, is 100 kilobytes (KB). In this case, p·S=5% of 100 KB=5 KB, and K=100 bytes. Thus, p·S≫K, and so C≈2/p=2/5%=40. That is to say, a typical private document (average size 100 KB) will produce about 40 fingerprints. If we assume each fingerprint contains an 8 byte hash value and 2 bytes of control information, then the average signature data per document will be 40 times (8+2) bytes or 400 bytes. In conclusion, in this example, there will be only about 400 bytes of signature data for each document to be protected, and any portion of a document whose length is no less then 5% of the original (normalized) document length will be guaranteed to be detected once leaked.

Sparse 0 mod P with Adaptive Window Sizing

Another innovative approach disclosed in this patent application improves upon the classical 0 mod P approach, particularly when applied in the context of an information leakage prevention system. This new approach may be referred to as "sparse 0 mod P with adaptive window sizing."

Unlike the classical 0 mod P technique, this technique has a guaranteed match feature and is an efficient technique. Furthermore, using this technique, the size of the fingerprint data is reduced (while still maintaining a guaranteed match feature). Furthermore, this technique is "adaptive" in that it adopts a floating window size which varies depending on the normalized size of each document.

As discussed below, under sparse 0 Mod P with adaptive window sizing, instead of selecting all hash values that are 0 mod P as fingerprints, only one 0 mod P hash value per window may be selected to be a fingerprint. This substantially reduces the amount of fingerprint data in comparison to the Winnowing technique.

Figure 4:
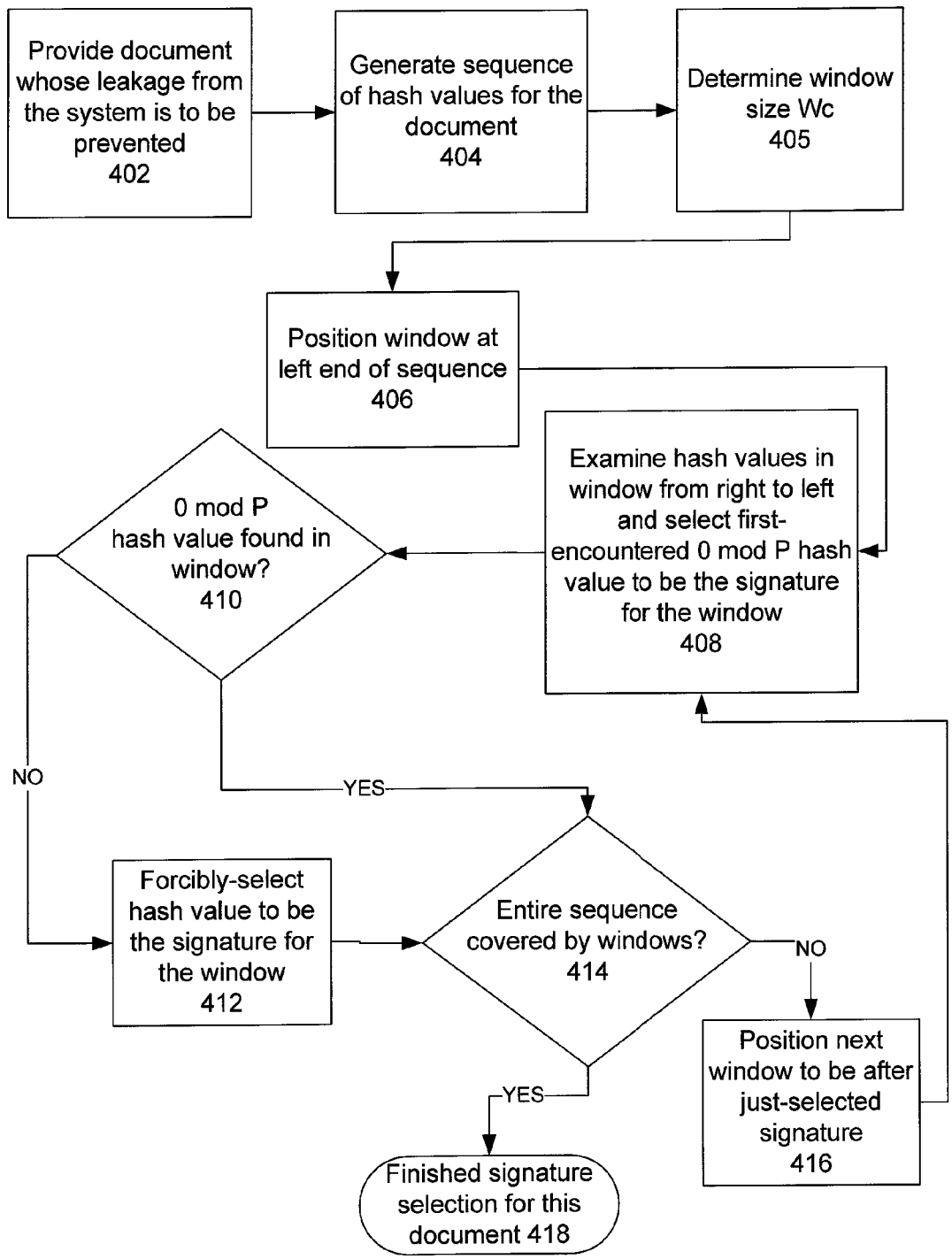
FIG. 4 is a flow chart depicting a process of generating fingerprints for a document at crawl time using sparse 0 mod P with adaptive window sizing in accordance with an embodiment of the invention.
Figure 5:
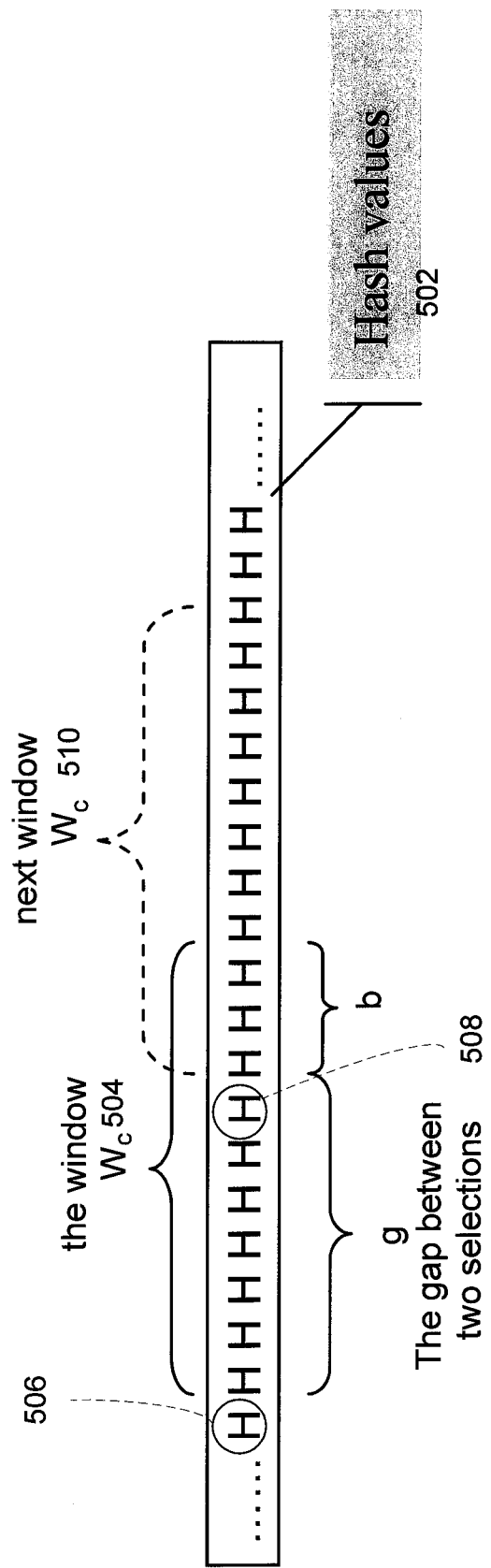
FIG. 5 is a diagram depicting the selection of hash values to be fingerprints in accordance with the sparse 0 mod P.

FIG. 4 is a flow chart depicting a process 400 of generating fingerprints for a document at crawl time using sparse 0 mod P with adaptive window sizing in accordance with an embodiment of the invention. The method 400 may be performed by executing appropriately configured computer-readable instructions, for example, at a server 120 of an enterprise sensitive-information management system 100. FIG. 5 is a diagram depicting the selection of hash values to be fingerprints using sparse 0 mod P in accordance with an embodiment of the invention.

The process 400 of FIG. 4 begins by providing 402 a document whose leakage from the system is to be prevented. A sequence of hash values for the document is then generated 404. As discussed above, the hash values may be generated by dividing the document into k-grams and hashing each k-gram to create a corresponding hash value. In FIG. 5, a sequential set of all hash values 502 from a document is depicted by the sequence of H symbols. Only some of these hash values will be chosen to be fingerprints (signatures). More particularly, under the Sparse 0 Mod P technique, only one 0 mod P hash value per window may be selected.

The floating window size $W_c$ (the subscript "c" referring to crawl time) may be determined 405 for a particular private document as follows. Provided p as the minimum guaranteed percentage and S as the size of a private document, then to have a guaranteed match, the following becomes true.

$$p \cdot S \geq W_c + K - 1 \quad \text{(Equation 1)}$$

Hence, the algorithm for choosing $W_c$ may be expressed as follows.

$$W_c = \begin{cases} p \cdot S - K + 1, & \text{if } S > \dfrac{W_{min} + K - 1}{p} \\ W_{min}, & \text{if } S \leq \dfrac{W_{min} + K - 1}{p} \end{cases} \quad \text{(Equation 2)}$$

According to the density of Sparse 0 mod P, the average number of fingerprints, C, extracted from a file is as follows.

$$C = (S - K + 1) \cdot \frac{1}{W_c - P + 1} \quad \text{(Equation 3b)}$$

Hence, combining Equations 2 and 3 gives the following expression the average number of fingerprints extracted from a file.

$$C = \begin{cases} \dfrac{S - K + 1}{p \cdot S - K - P + 2}, & \text{if } S > \dfrac{W_{min} + K - 1}{p} \\ \dfrac{S - K + 1}{W_{min} - P + 1}, & \text{if } S \leq \dfrac{W_{min} + K - 1}{p} \end{cases} \quad \text{(Equation 4b)}$$

If $p \cdot S \gg K$ and $p \cdot S \gg P$, then $C \approx 1/p$. Since in most cases S is much larger than K and P, a reasonable estimate of an average number of fingerprints extracted from a file is $C \approx 1/p$.

For example, consider that K=100, P=16, $W_{min}$=200, and p=5%. Furthermore, consider the situation where an average document size, S, is 100 kilobytes (KB). In this case, p·S=5% of 100 KB=5 KB, and so p·S is much greater than K and P. Thus, C≈1/p=1/5%=20. That is to say, a typical private document (average size 100 KB) will produce about 20 fingerprints. If we assume each fingerprint contains an 8 byte hash value and 2 bytes of control information, then the average signature data per document will be 20 times (8+2) bytes or 200 bytes. In conclusion, in this example, there will be only about 200 bytes of signature data for each document to be protected, and any portion of a document whose length is no less then 5% of the original (normalized) document length will be guaranteed to be detected once leaked.

Once the window of size $W_c$ is determined 405, the window is positioned 406 at a left end of the sequence of hash values. As described further below, this window is re-positioned as the procedure progresses. A currently-positioned window (current window) $W_c$ 504 is shown in FIG. 5.

Per block 408, hash values within a window may be examined from right-to-left, and the first-encountered 0 mod P hash value may be selected to be the signature for the window. This step may be understood in reference to the example shown in FIG. 5.

Consider the current window $W_c$ 504 depicted in FIG. 5. Note that the left edge of the current window $W_c$ 504 begins right after a previously-selected fingerprint 506 which is shown by a circle around the selected H symbol. Starting at the right edge of the current window $W_c$ 504, a hash value H is examined. If this current hash value H is not 0 mod P, then we go one step to the left and examine the preceding hash value H. If this current hash value H is not 0 mod P, then we go one step to the left and examine the preceding hash value H. This procedure continues until either a 0 mod P hash value is found, or the entire window has been examined.

Provided all hash values H are fully random, the probability of one hash value being 0 mod P would be 1/P. Define b (see FIG. 5) as the hash value count when the first 0 mod P hash value is found in a window. The expected mean value of b is P, and the expected mean value of the gap g is $W_c-P+1$.

In the specific case depicted in FIG. 5, the fourth hash value H 508 from the right edge of current window $W_c$ 504 is a 0 mod P hash value. Hence, this 0 mod P hash value 508 is selected as the one fingerprint (as indicated by the circle around the H symbol) for the current window $W_c$ 504.

While each sufficiently large window $W_c$ should usually have at least one 0 mod P hash value, there is a chance that none of the hash values in a window of size $W_c$ is a 0 mod P hash value. Under the fully random assumption, the probability of a window of size $W_c$ (where $W_c$ is the number of hash values in the window) having no hash value which is 0 mod P is $p_{fail}=[(P-1)/P]^{W_c}$. If $W_c$ is much larger than P, the $p_{fail}$ becomes small.

To have a guaranteed match feature, there must be at least one hash being selected as a fingerprint in each window. Therefore, although $p_{fail}$ may be very small, a procedure is still needed to handle these instances. A determination 410 is thus made as to whether a 0 mod P hash value was found in each window. If none of the hash values are found to be 0 mod P by the time the left edge of a window is reached, then the procedure 400 forces 412 the selection of a hash value within the window to be a fingerprint.

More particularly, in accordance with an embodiment of the invention, the forcibly-selected hash value may be such that the gap g (see FIG. 5) between this fingerprint and the previous fingerprint is equal to $W_c-P+1$. Such a forced selection results in g being approximately $W_c-P+1$ whether the 0 mod P selection succeeds or fails. This is because the expected mean value of b (see FIG. 5) is P, and the expected mean value of the gap g is $W_c-P+1$. In this embodiment, g will be approximately $W_c-P+1$ for successful 0 mod P selections and is set to be $W_c-P+1$ for forced selections. Hence, the density D of the signatures for this embodiment is approximately $1/-P+1$).

Once a fingerprint has been selected from the current window 504, then the next window W 510 is positioned. This next window 510 has its left edge right after the fingerprint 508 selected for the current window 504. The above-described procedure is then repeated for this next window $W_c$ 510, and so forth until fingerprint selection is completed for windows spanning the entire set of hash values 502. In other words, a determination 414 is made as to whether the entire sequence of hash values H 502 has been covered or spanned by the windows. If not, then the next window is positioned 416 to be right after the just-selected signature. Once the entire sequence is covered, then the signature (fingerprint) selection for the document is completed or finished 418 with two sets of signatures being generated: set A with fingerprints selected by virtue of their being 0 mod P hashes; and set B with fingerprints that were forcibly-selected. For typical values of $W_c$ and P, fingerprint set A is expected to be much larger than fingerprint set B.

Figure 6:
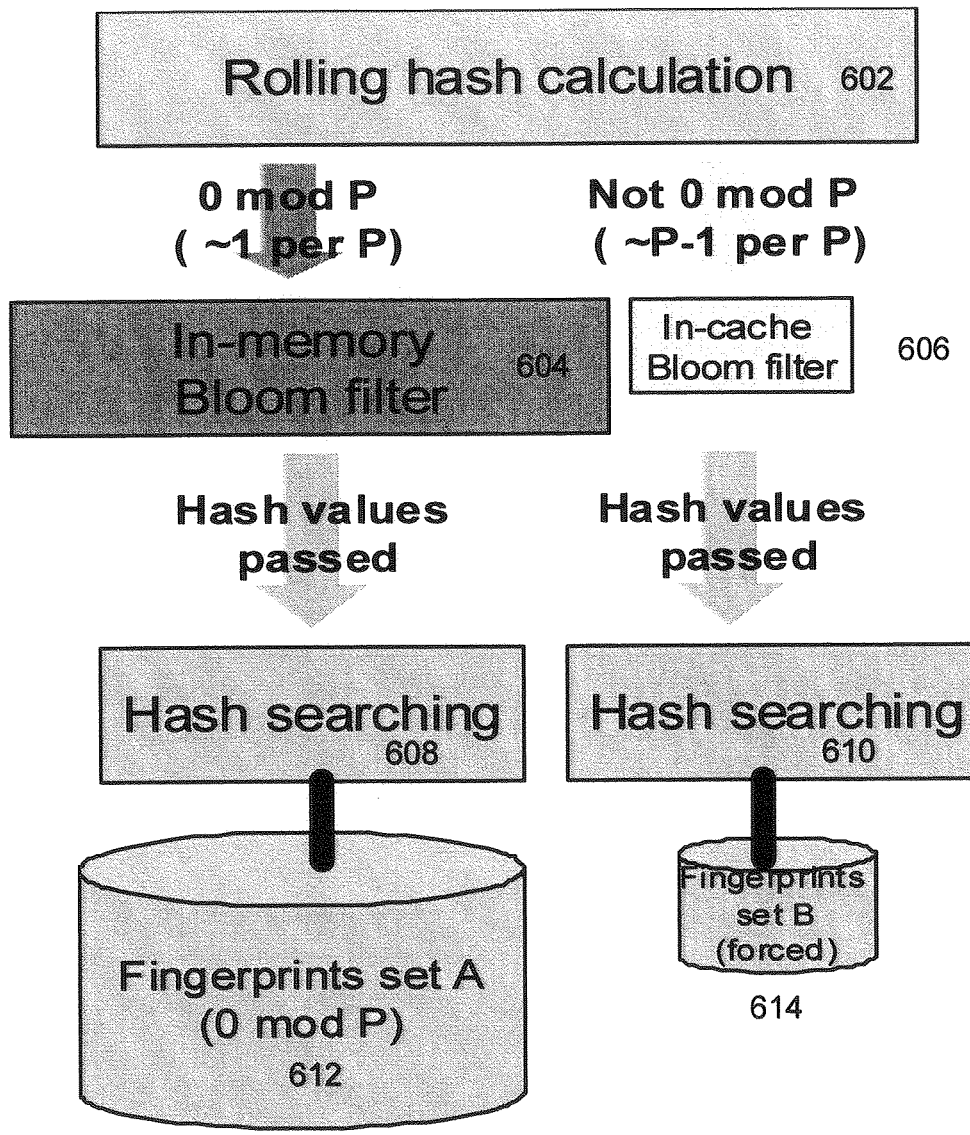
FIG. 6 is a diagram depicting a process performed at match time using sparse 0 mod P in accordance with an embodiment of the invention.

FIG. 6 is a diagram depicting a process 600 performed at match time using sparse 0 mod P in accordance with an embodiment of the invention. The process 600 may be performed by executing appropriately configured computer-readable instructions, for example, at deployment points 110 of an enterprise sensitive-information management system 100.

A rolling hash calculation 602 is performed on the target document. Here, the target document is the document that is being examined to determine if sensitive information is being leaked from the set of protected documents. The rolling hash calculation proceeds from one end of the target document to the other end and generates a hash value for each k-gram encountered.

The hash values generated by the rolling hash calculation are then examined to determine whether or not they are 0 mod P hash values. Hash values that are 0 mod P (about one hash value per P hash values will be 0 mod P) may then be processed by a first Bloom filter 604. On the other hand, hash values that are not 0 mod P [about (P-1) hash values per P hash values will fall into this category] may be processed by a second Bloom filter 606. The Bloom filters 604 and 606 are used as pre-filters to greatly reduce the number of searches 608 and 610, respectively, performed on the fingerprint sets A 612 and B 614, respectively.

A Bloom filter is a known technique which uses a data structure to quickly determine if an element (such as a hash value) is part of a set (such as a set of fingerprints). A Bloom filter may return a false positive (where the element is indicated to be part of the set, but it is not), but it should not return a false negative (where the element is not indicated to be part of the set, but it is).

The first Bloom filter 604 serves as a filter for fingerprint set A 612, and the second Bloom filter 606 serves as a filter for fingerprint set B 614. As discussed above, fingerprint set A (which includes those fingerprints selected by virtue of their being 0 mod P hashes) is generally expected to be much larger than fingerprint set B (which includes fingerprints that were forcibly-selected).

Hence, the first Bloom filter 604 is preferably configured in main memory of a computer system as an in-memory filter, while the second Bloom filter 606 is preferably configured in cache memory of a computer system as an in-cache filter. The first Bloom filter 604 may be configured in-memory, for example, as a 200 MB (megabyte) Bloom filter which may be configured to have a probability of false positives which is less than 0.001 for a set of 100,000,000 hash values. As long as the fingerprint set B is sufficiently small, for instance, less than 2 million hash values, the second Bloom filter 606 may fit into, for example, a level 2 (L2) cache of a common microprocessor and have high performance.

The scale of the second Bloom filter 606 depends on the number of hash values in fingerprint set B 614. The signatures in fingerprint set B 614 were produced by the above-discussed forced-selection situations.

For a given window of $W_c$ hash values, consider that there are N unique hash values in the window, N being less than or equal to $W_c$. The probability of needing a forced-selection of a fingerprint becomes $p_{fail}=[(P-1)/P]^N$.

FIG. 7 gives a table showing values of $p_{fail}$ given select values of P and N. In particular, $p_{fail}$ values are given for P=8 or 16 and for N=50, 100, 200, or 400.

Now consider the following very conservative and rough estimation. Assume P=16 and that in 10% of the windows N=50, in 20% of the windows N=100 and in 70% of the windows N is greater than or equal to 200. We can then estimate that $p_{fail}$ is less than or equal to $10\% \times 0.04 + 20\% \times 0.0016 + 70\% \times 2.5 \times 10^{-6} = 0.0072$. This means that fingerprint set B 614 is expected to include less than one percent of the total number of signatures (the other 99% plus being in fingerprint set A 612. Note, again, that the preceding is a very conservative and rough estimation. Thus, the former described in-cache Bloom filter is shown to be feasible and practical. Based on that, during match time processing, a small fraction 1/P of hash queries will go to the relatively big and slow part (in-memory filter and Set A) while a large fraction (P−1)/P of hash queries will go to the relatively small and fast part (in-cache filter and Set B). Hence, the solution is shown to be advantageously efficient in processing the hash queries.

The above-discussion describes embodiments where the window size is adaptively determined so as to vary linearly with a predetermined guaranteed match percentage and also to vary linearly with the size of the private document. Applicants note that it is also possible to use other criteria to adaptively determine the window size. The window size at crawl time may even vary during the fingerprinting a private document. Such change in the window size in the middle of the fingerprinting of a document may depend on various pre-set criteria.

Conclusion

Various embodiments may be implemented using one or more hardware elements and/or one or more software elements.

In general, a hardware element may refer to any hardware structure arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

While particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A process of information leakage prevention, the process comprising:
    extracting fingerprints from private documents using a first method, wherein the first method adaptively determines a size of a window depending on a size of the private document;
    extracting fingerprints from a suspect document using a second method, wherein the second method differs from the first method; and
    matching said fingerprints extracted from the suspect document with said fingerprints extracted from the private documents.

2. The process of claim 1, wherein the size of the window is adaptively determined by the first method to vary linearly with a predetermined guaranteed match percentage and also to vary linearly with the size of the private document.

3. The process of claim 2, wherein the size of the window has a predetermined minimum size.

4. The process of claim 3, wherein the second method uses a window with the predetermined minimum size in extracting fingerprints from the suspect document.

5. The process of claim 1, wherein the second method comprises:
performing a rolling hash calculation on the suspect document;
determining if a hash value is 0 modulo P, where P is a predetermined number;
applying a first filter if the hash value is 0 modulo P; and
applying a second filter if the hash value is not 0 modulo P.

6. The process of claim 5, wherein the first and second filters each comprise a Bloom filter.

7. The process of claim 5, wherein the first filter comprises a data structure configured in main memory of a computing device at a deployment point.

8. The process of claim 7, wherein the second filter comprises a data structure configured in cache memory of a computing device at a deployment point.

9. A computer apparatus for fingerprinting an electronic document to be protected by an information leakage protection system, the apparatus comprising:
a processor configured to execute computer-readable instructions;
memory configured to store data, including said computer-readable instructions; and
a communications system interconnecting said processor and memory,
wherein said computer-readable instructions are configured to
extract fingerprints from private documents using a first method, wherein the first method adaptively determines a size of a window depending on a size of the private document;
extract fingerprints from a suspect document using a second method, wherein the second method differs from the first method; and
match said fingerprints extracted from the suspect document with said fingerprints extracted from the private documents.

10. The computer apparatus of claim 9, wherein the size of the window is adaptively determined by the first method to vary linearly with a predetermined guaranteed match percentage and also to vary linearly with the size of the private document.

11. The computer apparatus of claim 10, wherein the size of the window has a predetermined minimum size.

12. The computer apparatus of claim 11, wherein the second method uses a window with the predetermined minimum size in extracting fingerprints from the suspect document.

13. The computer apparatus of claim 9, wherein the second method comprises:
performing a rolling hash calculation on the suspect document;
determining if a hash value is 0 modulo P, where P is a predetermined number;
applying a first filter if the hash value is 0 modulo P; and
applying a second filter if the hash value is not 0 modulo P.

14. The computer apparatus of claim 13, wherein the first and second filters each comprise a Bloom filter.

15. The computer apparatus of claim 13, wherein the first filter comprises a data structure configured in main memory of a computing device at a deployment point.

16. The computer apparatus of claim 15, wherein the second filter comprises a data structure configured in cache memory of a computing device at a deployment point.

* * * * *